Figure 2:
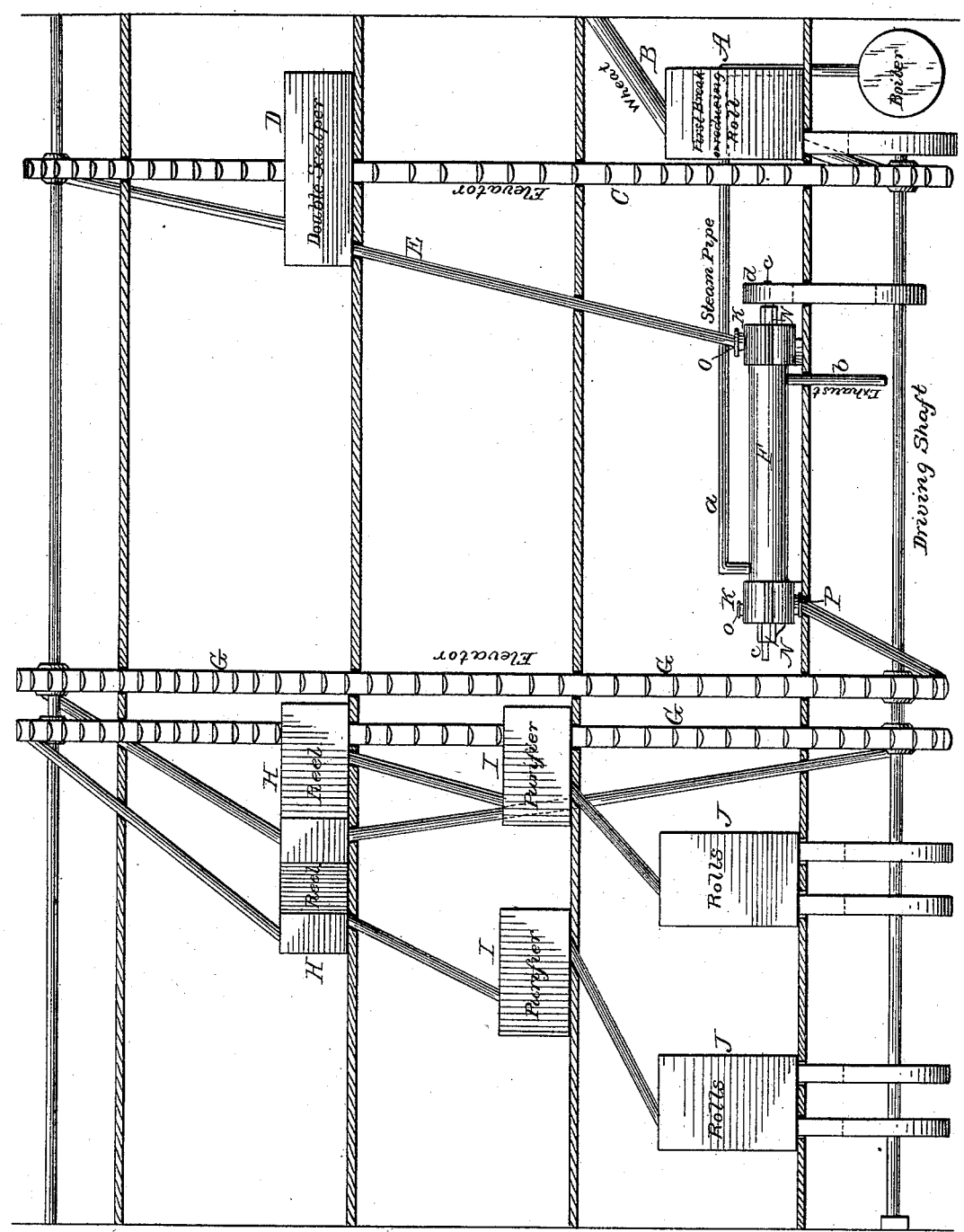

(No Model.) 2 Sheets—Sheet 1.
A. R. PARKISON & J. PULLINGER.
APPARATUS FOR TREATING MIDDLINGS.
No. 395,580. Patented Jan. 1, 1889.
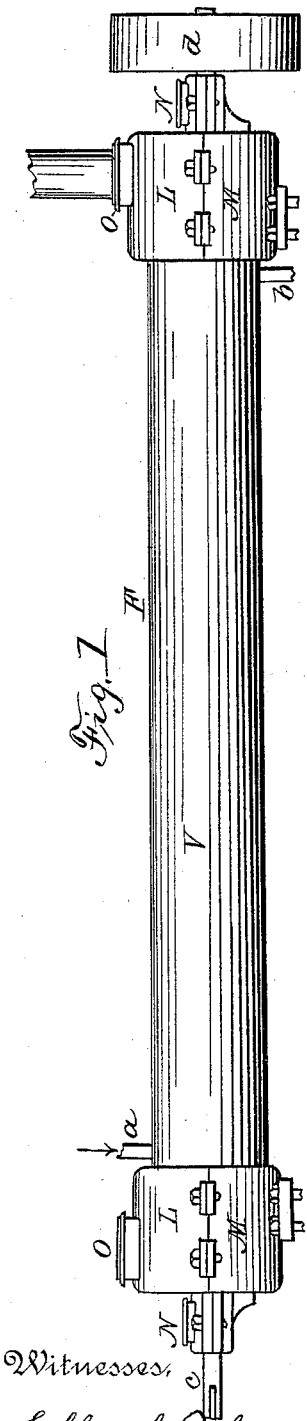
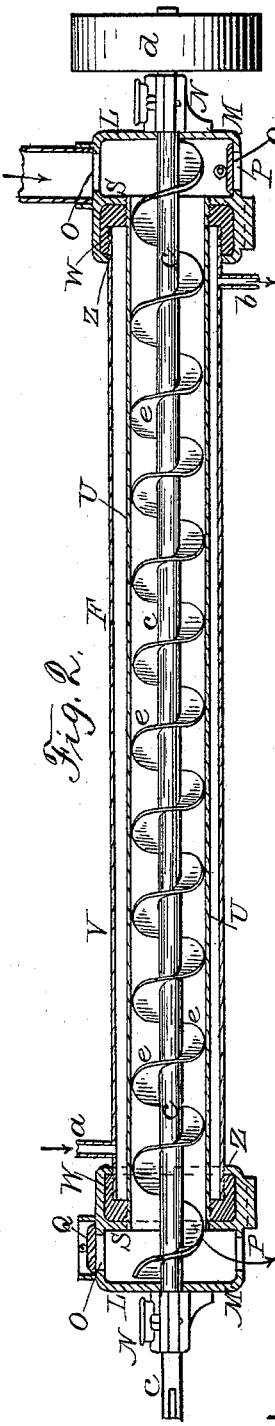
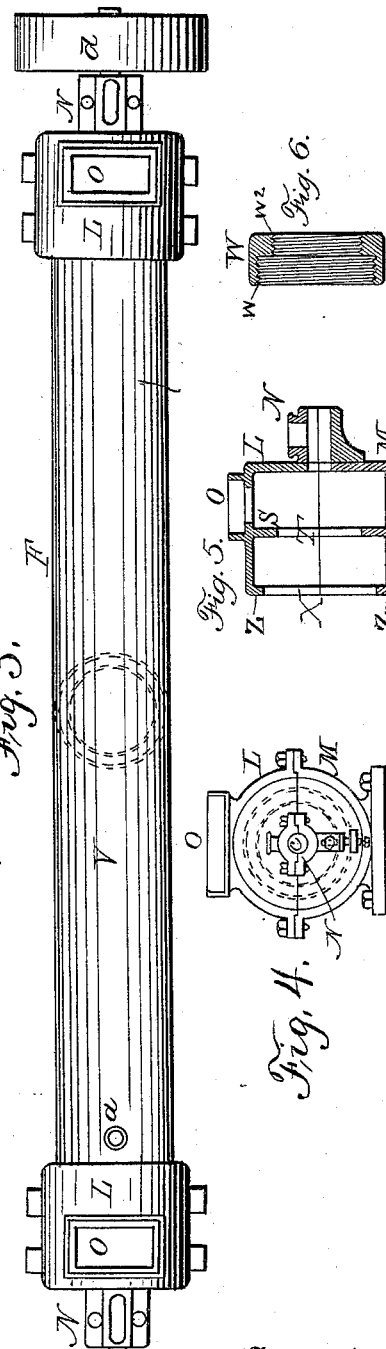
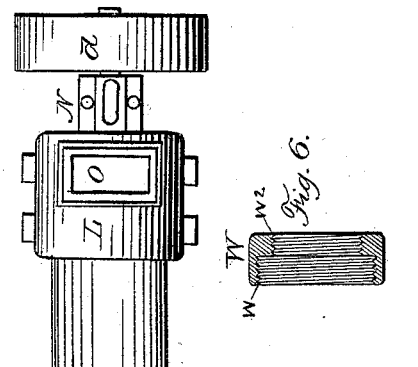
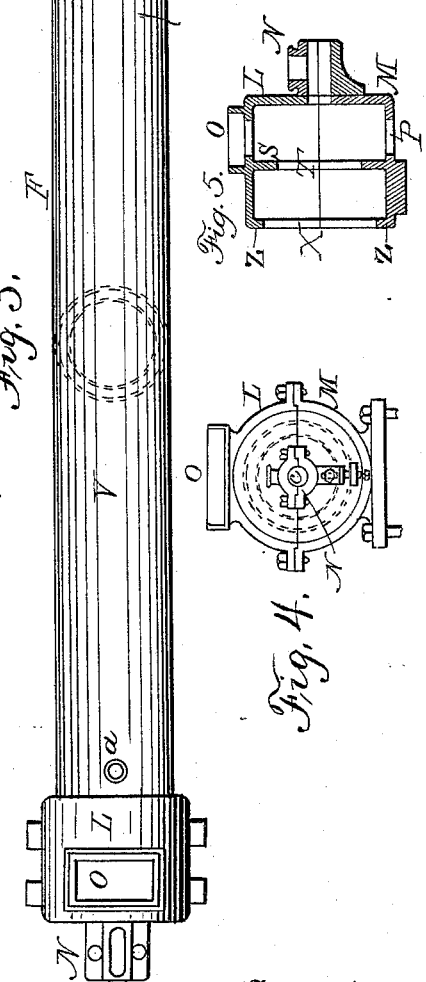
Witnesses:
Ella S. Johnson
Francesca S. Cowie
Inventors
Allen Rodgers Parkison
James Pullinger
By his Attorneys
Johnson & Johnson (No Model.) 2 Sheets—Sheet 2.

A. R. PARKISON & J. PULLINGER.
APPARATUS FOR TREATING MIDDLINGS.

No. 395,580. Patented Jan. 1, 1889.

Witnesses.
Inventors.
By his Attorneys

UNITED STATES PATENT OFFICE.

ALLEN RODGERS PARKISON AND JAMES PULLINGER, OF MONONGAHELA CITY, PENNSYLVANIA, ASSIGNORS OF ONE-THIRD TO JAMES M. McGREW, OF SAME PLACE.

APPARATUS FOR TREATING MIDDLINGS.

SPECIFICATION forming part of Letters Patent No. 395,580, dated January 1, 1889.

Application filed October 3, 1887. Serial No. 251,329. (No model.)

*To all whom it may concern:*

Be it known that we, ALLEN RODGERS PARKISON and JAMES PULLINGER, citizens of the United States, residing at Monongahela City, in the county of Washington and State of Pennsylvania, have invented new and useful Improvements in Apparatus for Treating Middlings by Heat, of which the following is a specification.

Our invention relates to an apparatus for treating middlings or similar product by heating it after it has been treated in the first breaking or reducing rolls and before it passes to the apparatus for further purifying and separating the product.

The various known grinding and purifying and separating apparatus are employed with our conveyer-heater tube, through which the products pass and in which they are thoroughly and highly heated, and it is the construction and adaptation of the conveyer-heater for such an operation which constitutes the subject-matter of our improvement. In this gradual heating action the middlings enter the heater at the point where the heat is least and leave it at the point where the heat is greatest, so that in the passage of the middlings through the tube they are gradually heated to a high degree as they reach the point of discharge. This is the way in which we obtain the desired heat without endangering the scorching of the middlings, for it would not do to introduce the middlings into so small a tube as we use under the highest degree of heat with which they are treated under our invention. Our invention, therefore, embraces the gradual and uniform heating of the middlings in a single screw-conveyer passage through a tube free from the drying effects of air-blasts, and by which the flour is improved, the yield increased, and the bread made better. By our invention an inferior grade of wheat will make better bread than heretofore obtained from such wheat.

Various apparatus and processes have been tried for the purpose of heating the products of grinding during the purifying and separating of the same; but in all these apparatus and processes indifferent results have been attained, as all the various processes have had more or less tendency to dry the product in such a manner that the bran and the germ become hard and dry and are ground with the flour and passed through the bolting-cloth, deteriorating the quality of the flour, while in our invention the bran and germ are sufficiently heated to become softened and toughened, while the moisture is evaporated after the product leaves the heater.

We will now describe the apparatus, illustrated in the accompanying drawings, by which these and other objects are attained, and by specific claim concluding this specification designate the organization of the devices and combination of parts claimed as our invention.

In the accompanying drawings, which form a part of this specification, and in which similar letters of reference indicate corresponding parts in all the figures, Figure 1 is a side elevation of the conveyer-heating apparatus. Fig. 2 is a longitudinal vertical sectional view of the same. Fig. 3 is a top plan view. Fig. 4 is an end view. Fig. 5 shows one of the end-chambered castings in section detached from the heater and conveyer connections. Fig. 6 shows the screw-ring for the conveyer and heating tubes. Fig. 7 is a vertical diagram showing the manner of using our conveyer-heater.

In the drawings the letter A indicates the first breaker or reducer, which may be of any suitable construction, and which receives the grain to be ground through the feed-spout B and delivers the ground product into the elevator C, which carries the said product to the double scalper D, from which a spout, E, conveys the product to the conveyer-heater F, the construction of which will be more fully described hereinafter.

From the conveyer-heater the heated product is carried, by means of elevators G, to the reels H, from which it passes to the purifiers I and from them to the breakers or rolls J, from which the product is conveyed off to further separating and reducing machines.

All the machines, with the exception of the conveyer-heater, may be of any approved construction.

The conveyer-heater consists of two end-chambered parts, consisting each of a top and a bottom casting, respectively lettered L and M, and having each a bearing, N, in the outer side or head, the said bearing being formed by two box-halves, each secured to one portion of the chambered part, and a tubular inclosed conveyer-heater part secured within the end chambers. The end-chamber parts have inlet-apertures O in their upper sides and outlet-apertures P in their under sides, and one of these outlet-apertures is closed with a lid, Q, having preferably an eye upon its upper side, by means of which eye it may be removed when desired to make said opening an outlet, and then used to close the inlet-opening O, as hereinafter explained.

A partition, S, is formed in the middle of each end-chambered part, so as to divide it into two chambers, and this partition is formed with a central aperture, T, into which the end of a tubular conveyer-casting, U, is fitted, so as to open into the receiving-chamber. The other chamber part has a larger opening, X, at its inner end to receive the open end of a larger tubular casting, V, which surrounds the conveyer-casting and forms an annular space between the two tubes as a heating-chamber. Each end of these tubular parts has an exterior screw-thread, and to secure them within the chambered-end parts a ring, W, of suitable metal, is fitted snugly within the second chamber, and held therein by a projecting flange, Z. This ring is made of two interior diameters, which are screw-threaded at $w$ $w^2$ to receive the screw-threaded ends of the tubes and thus lock them together with a steam-tight joining.

The tubes being first secured within the screw-rings, the latter are then placed in the lower portions of the end-chambered parts and secured within them by the upper portions being secured over them, forming the entire chambers, the screw-rings forming steam-tight joints for the ends of the tubular castings. The tubular chamber space formed between the tubular castings is provided with a steam-inlet pipe, $a$, at one end, and with a steam-outlet pipe, $b$, at the other end, by means of which the said chamber-space and inner tube are gradually and uniformly heated throughout their entire length by steam introduced in a direction opposite to that in which the stuff is fed out. The ends of a shaft, $c$, having a suitable drive-pulley, $d$, or other gear at one end, are journaled in the boxes or bearings formed in the closed heads of the end-chambered parts, and this shaft is provided with a spiral conveying-flange, $e$, bearing with its outer edge close to the inner walls of the inner tubular casting, so that middlings or other products of grinding grain may be conveyed from one end to the other when fed into the tube by revolving the conveyer-shaft.

By having an inlet and an outlet aperture in each end chamber the direction of the feed may be changed by changing the direction of the revolutions of the conveyer-shaft, the outlet-aperture at the feed end and the inlet-aperture at the discharge end being closed, and by having the conveyer-shaft extending through both ends of the heater the driving-pulley may be fitted at either end, rendering the heater adapted to fit any arrangement of the milling machinery.

It will be seen that by having a continuous flow of steam into the steam-space at the discharge end the contents of the inner tubular casting may be gradually heated, and may have a dry heat, but without any blast imparted to them, the contents not coming in contact with the steam used for heating, and the contents may be fed through the tubular casting at more or less speed, and may thus be subjected to the heat for a shorter or longer space of time during a single heating operation. By governing the flow of the steam or other heating medium used, hot water or air being equally as applicable, the degree of heat may be governed; but the direction of the feed and the direction of the flow must be opposite. For this purpose, when the direction of the feed is reversed by changing the inlet and the outlet end for end and reversing the motion of the conveyer, the apparatus is then reversed in position, so that the bottom outlet-tube, $b$, will then become the inlet, and the tube $a$ will then become the outlet for the heating medium; or for this purpose the outer heating-tube may be provided with an inlet and an outlet tube at each end having suitable controlling-cocks, whereby it will be unnecessary to reverse the position of the apparatus.

The preferable speed of the conveying-shaft is from sixty to a hundred revolutions per minute, and the length of the chamber is preferably about ten feet with an interior diameter of six inches, the steam-space being about one inch, giving the outer tubular casting about eight inches diameter; but these proportions, as well as the speed of the conveyer-shaft, may be changed according to the quantity of product to be treated and according to the condition and quality of the product.

By softening the bran by heat in the way described the bran will not be crushed during the further cleaning, separating, or milling of the product, so that there will be no danger in our process of carrying minute particles of bran with the flour through the bolting-cloth, as is liable to happen when the milling product is treated by a drying air-blast, and by our process the particles of flour will more easily be separated from the softened and toughened bran than from bran which is hard and dry.

The germ, which is rather wax-like, will by our heater be softened and toughened by our way of heating, so that during the cleaning and reducing it will be perfectly freed from all adhering particles of flour, while it will not be pulverized and pass out with the flour, but on account of its toughened and softened state pass out with the tailings.

The way we heat the product will thus dry the flour and make it more readily pass through the bolting-cloth, while it will render the bran and germ softer and tougher, preventing them from passing through the cloth or from being more finely divided, and the heat of the product will assist in driving out all bugs or insects destructive to the cloth, as well as in keeping the bolting-cloth at an even temperature, rendering the same grade of cloth fit to be used during all changes of climate and all seasons of the year, without the necessity of changing the grades of bolting-cloth according to the changes of climate and temperature, and without the annoyance of having the flour and bran caking and forming clods upon the cloth.

The product heated in the heater in the way stated will be slowly cooled as it passes through the various purifiers and reducing-machines, there will be no sweating of the same, the heat driving all moisture out of the flour, and causing it to be evaporated during the passage through the various machines, so that the flour is finally delivered in a heated condition.

It is important to have the product gradually heated in a comparatively short time, and by employing the heater herein described, having the live steam entering at the discharge end and the exhaust-steam passing out at the feed end of the heater, the product will be subjected to a gradually-increasing heat as it passes through the heater receiving the highest degree of heat immediately before being discharged, and we obtain the best results in the flour product.

Referring to the reversible capacity of the conveyer-heater, such advantage is of great importance in mills where the machinery is crowded, and as our improvement can be applied to mills in use the conveyer-heater can, by reason of its construction, be set so as to be fed at either end or discharge at either end by reversing the motion of the conveyer in the well-known way of cross-belting. Without this reversible capacity of the conveyer-heater it might require in some mills a change in the machinery and the employment of separate conveyers with separate elevator-connections.

Our invention also permits the convenience of placing the driving-pulley on either end of the conveyer-shaft, according to the arrangement of the milling machinery.

Our invention improves the flour, makes it whiter and drier, improves the bread, makes it rise quicker, and prevents it from drying so quickly, and the flour will not sour or become musty so quickly, why we do not know, except it be that the life-food of the grain is dried into the meal.

By providing a steam-chamber surrounding the conveyer-tube the heat of the middlings is alike at the top and at the bottom of the conveyer, and by having the conveyer extend into a chamber at each end it can be made to feed either way and to feed from a chamber and discharge from a chamber which constitutes a part of the heater. Two or more conveyer-heaters may be in line upon the same shaft.

In a middlings-heater having a conveyer-tube through which the stuff is fed, and an outer tube forming an annular chamber for steam for heating the conveyer-tube, it is important that the tubes be connected in such a manner at their ends as to maintain steam-tight joints. For this purpose we have provided a chambered box as a separate device fitted upon the ends of both tubes, so as to seal the end of the outer one externally and the steam-space internally in relation to the inner tube and the chamber of the box through which the product passes. It is important that in such chambered box provision be made for the convenient putting together and securing the several parts of the heater. For this purpose we have constructed the chambered boxes in two parts as a means for allowing the use of an interior screw-locking ring for securing both ends of the tubes within a chamber of said box. The construction is also such that the device as an entirety is adapted to be connected at both ends with the milling machinery and with the power, however these may be located in the mill.

It is important, also, to provide joint-connections for the tubes which cannot be sprung or opened by the expanding and contracting action of the tubes. This is effected by the provision of a screw-ring, which is locked directly to the ends of both tubes and to the chambered boxes. It is also important that the moving stuff should not be subjected to the highest degree of heat at its entrance into the conveyer, for the reason hereinbefore stated, and for effecting this the steam is caused to flow in a direction opposite to that of the feed of the stuff, so that the least heat is at the receiving end of the conveyer and the stuff is gradually subjected to an increasing degree of heat from the inlet to the point of discharge.

Having thus described our invention, what we claim as new, and desire to secure by Letters Patent, is—

1. In apparatus for heating middlings and similar product, the combination of the inner tube, the outer tube forming the intervening heating-space, and a conveyer arranged within the inner tube, with chambered parts secured upon the ends of said tubes, each part having a chamber into which the conveyer-tube opens at each end, and having, also, a chamber for receiving the ends of the outer tube, and a screw-ring within said chamber closing the ends of the outer tube, as described, and for the purpose specified.

2. In apparatus for heating middlings and similar product, the combination of the chambered-end parts each having a top and a bottom opening, O and P, an interior partition, S, and an inward-projecting end flange, Z, the removable lids Q, the outer tubular casting having the steam inlet and outlet pipes $a\ b$, and provided at both ends with exterior screw-threads, the inner tubular casting provided at both ends with exterior screw-threads, the rings W, having the interior screw-threads, $w\ w^2$, of different diameters, and the conveyer, substantially as described, for the purpose specified.

3. The middlings-heater herein described, consisting of the inner and the outer tubes forming an intervening chamber for containing steam, the outer tube provided with a pipe at one end at the top and at the other end at the bottom, the end-chambered parts having top and bottom openings, the lids for closing one of these openings in each chambered part, the rings W, each having two interior screw-threaded parts of different diameters adapted to fit upon the ends of the said tubes, and a conveyer having its shaft C mounted in bearings in said chambered parts and projecting alike at each end outside of said chambered parts to receive the pulley D on either end, whereby the conveyer may be driven from either end of its shaft, and the operation of the conveyer reversed in the manner and for the purpose stated.

4. The combination, with the inner and the outer tubes and a screw-conveyer operating within the inner tube, of the chambered parts formed of two equal box parts arranged upon these tubes at each end, each box part having bearing parts of different diameters with their centers in the same axial line, and a screw-ring adapted to be screwed upon the ends of said tubes, in the manner and for the purpose described.

In testimony whereof we have hereunto set our hands in the presence of two subscribing witnesses.

ALLEN RODGERS PARKISON.
JAMES PULLINGER.

Witnesses:
J. H. CARMACK,
R. McMILLAN.